US006951609B2

(12) United States Patent
Yamanaka et al.

(10) Patent No.: US 6,951,609 B2
(45) Date of Patent: Oct. 4, 2005

(54) HIGH-PURITY WATER PRODUCING APPARATUS

(75) Inventors: Koji Yamanaka, Tokyo (JP); Hiroshi Inoue, Tokyo (JP)

(73) Assignee: Organo Corporation (JP)

( * ) Notice: Subject to any disclaimer, the term of this patent is extended or adjusted under 35 U.S.C. 154(b) by 39 days.

(21) Appl. No.: 10/389,013

(22) Filed: Mar. 14, 2003

(65) Prior Publication Data

US 2003/0173282 A1 Sep. 18, 2003

(30) Foreign Application Priority Data

Mar. 18, 2002 (JP) ........................................ 2002-073696

(51) Int. Cl.[7] .............................. C02F 1/42; C02F 9/00
(52) U.S. Cl. ........................ 210/202; 210/259; 210/266; 210/282; 210/900
(58) Field of Search ................................ 210/266, 282, 210/900, 202, 259; 521/25

(56) References Cited

U.S. PATENT DOCUMENTS

| 5,614,088 | A | * | 3/1997 | Nagai et al. | 210/188 |
|---|---|---|---|---|---|
| 5,626,750 | A | * | 5/1997 | Chinn | 210/275 |
| 5,833,846 | A | * | 11/1998 | Tanabe et al. | 210/202 |
| 6,494,223 | B1 | | 12/2002 | Ohmi et al. | 134/201 |
| 2003/0150732 | A1 | * | 8/2003 | Yamanaka et al. | 204/533 |

FOREIGN PATENT DOCUMENTS

| EP | 0 572 035 A2 | 5/1993 | ............. C02F/1/00 |
|---|---|---|---|
| JP | 58-81483 | 5/1983 | |
| JP | 4-78483 | 3/1992 | |
| JP | 8-252579 | 10/1996 | |
| JP | 10-192716 | 7/1998 | |
| JP | 10-192717 | 7/1998 | |
| JP | 10-216717 | 8/1998 | |
| WO | WO 98/03242 | * 1/1998 | |
| WO | WO 98/59238 | * 12/1998 | |
| WO | WO 02/083770 A1 | 10/2002 | ............. C08J/5/20 |
| WO | WO 02/083771 A1 | 10/2002 | ............. C08J/5/20 |

OTHER PUBLICATIONS

Patent Abstracts of Japan, No.: 04–078483, published Mar. 12, 1992.
Patent Abstracts of Japan, No.: 58–081483, published May 16, 1983.
Patnet Abstracts of Japan, No. 08–252579, published Oct. 1, 1996.
Patent Abstracts of Japan, No. JP10192716, published Jul. 28, 1998.
Patent Abstracts of Japan, No. JP10192717, published Jul. 28, 1998.
Patent Abstracts of Japan, No. JP10216717, published Aug. 18, 1998.
"New Designs of Macroprous Polymers and Supports: From Separation to Biocatalysis" Authors: Frantisek Svec and Jean M.J. Frechet As Published in SCIENCE vol. 273, Jul. 12, 1996 pp. 205–211.

(Continued)

Primary Examiner—Ivars C. Cintins
(74) Attorney, Agent, or Firm—Osha Liang LLP (57) ABSTRACT

A module filled with an organic porous ion exchanger is placed midway on a pipe for transporting high-purity water to be supplied to a point-of-use. As the organic porous ion exchanger is used an organic porous ion exchanger having a three-dimensional mesh structure with mesopores, having an average diameter of 1 μm to 1000 μm, in a wall between interconnected macropores and in which an ion exchange group is uniformly distributed and an ion exchange capacity is 0.5 mg equivalent weight/gram of dried porous body or greater.

8 Claims, 4 Drawing Sheets

OTHER PUBLICATIONS

"Characteristics and Application Techniques of Porous Bodies" Editor: Yasushi Takeuchi, as Published by Fujitech Corpopration Published in First Edition, Mar. 30, 1999, pp. 2–5 Excerpt Translation (1 page) also enclosed.
European Search Report Dated Jul. 11, 2003.
English Abstract of Japanese Publication No. 2000228387 dated Aug. 15, 2000.

English Abstract of Japanese Publication No. 04078483 dated Mar. 12, 1992.
English Abstract of Japanese Publication No. 08089954 dated Apr. 9, 1996.
English Abstract of Japanese Publication No. 07185544 dated Jul. 25, 1995.

* cited by examiner

HIGH-PURITY WATER PRODUCING APPARATUS

BACKGROUND OF THE INVENTION

1. Field of the Invention

The present invention relates to an apparatus for producing high-purity water to be used in the semiconductor manufacturing industry or the like.

2. Description of the Related Art

In general, high-purity water (in the specification, the term "high-purity water" refers to highly pure water such as "pure water" and "ultra-pure water" for which no general definition exists) is produced by treating raw water such as river water, ground water, and industrial water through a pretreatment process to remove most of suspended and organic substances from the raw water and subsequently treating the pretreated water by a primary pure water producing device and a secondary pure water producing device (also referred to in the specification as a "subsystem"). The produced high-purity water is then supplied to a point-of-use such for example as wafer washing in the semiconductor manufacturing industry. The high-purity water is highly pure to such a degree that even a quantitative analysis of the impurities is difficult, but still contains some impurities. The influences of these minute amount of impurity compositions contained in the high-purity water on products such as semiconductor devices cannot be ignored in devices of high degree of integration (highly integrated devices), and, therefore, there is a strong demand for obtaining high-purity water having an even higher purity than the conventional high-purity water.

For example, the high-purity water produced in the subsystem is supplied to the point-of-use through pipes, but the pipes between the subsystem and the point-of-use in some cases are several hundreds of meters long in length. Because of this, impurities such as particulates (or particles) and metal ion compositions mix from the pipes into the high-purity water in a very small amount and sometimes adversely affects characteristics of devices. For example, metal pollution may adversely affect the electrical characteristics of the devices and particles may cause pattern defects, disconnection, and defects in dielectric strength. In addition, the compositions that are not removed in the high-purity water producing apparatus may also adversely affect characteristics of the devices, and when, for some reason, there is a leak from the high-purity water producing apparatus instantaneously or for a short period, the device characteristics may be adversely affected.

As a solution for such contamination, methods for further treating the high-purity water immediately before the point-of-use have been proposed. For example, Japanese Patent Laid-Open Publication No. Hei 4-78483 discloses a method for providing a column filled with ion exchange fiber immediately before the point-of-use. Japanese Patent Laid-Open Publication No. Sho 58-81483 discloses a method for providing an ultrafiltration membrane module immediately before the point-of-use. Each of these methods, however, has a disadvantage that because the primary target of the column filled with ion exchange fiber is ionic impurities, the removal performance for the particulates is not sufficient, and although the ultrafiltration membrane module can remove particulates, it cannot remove dissoluble impurities such as ions.

In addition, an ion adsorption module which is filled with an ion adsorption membrane is known as a module having both particulate and ionic impurity removal functions. Known configuration of the ion adsorption membrane to be used in such a module include a plate type and a spiral type which are created from a planar membrane, a tubular type, and a hollow fiber membrane (Japanese Patent Laid-Open Publication No. Hei 8-89954). Suitable membrane configurations are determined and commercialized based on the objective of the use, etc. However, because these ion adsorption membranes are formed by introducing an ion exchange group or the like to an olefin-based porous membrane or the like through radical polymerization or radiation-induced polymerization, there are problems in that the introduction density of the ion exchange group or the like to be introduced is low and in that the section to be introduced is limited to a region proximate to the membrane surface. In other words, because the introduction density of the ion exchange group or the like is low, the ion adsorption capacity of the module as a whole is small and because the ion exchange group or the like is not uniformly distributed, the adsorbed ions tend to spread within the module in the direction of the flow, causing a longer ion exchange band which is a mixed region of the ion adsorbing section and non-adsorbing section within the module and greater tendency for a small amount of leakage to occur. Because of this, when the module is used as a module for the final treatment of high-purity water wherein impurities in the order of nanograms per liter (ng/L) or picograms per liter (pg/L) may be inimical, the purity of the treated water leaves much to be desired, and thus, there is disadvantage in that the module must be frequently replaced.

SUMMARY OF THE INVENTION

An advantage of the present invention is that high-purity water can be stably supplied to the point-of-use.

According to one aspect of the present invention, there is provided a high-purity water producing apparatus for transporting high-purity water through pipes and supplying the high-purity water to a point-of-use wherein a module filled with an organic porous ion exchanger having a specific structure is provided midway on the pipe for transporting high-purity water. Such a module permits effectively removing a small amount of impurities such as particulates (particles) and ion compositions mixed into the high-purity water which is being transported to the point-of-use.

DESCRIPTION OF PREFERRED EMBODIMENT

Figure 1:
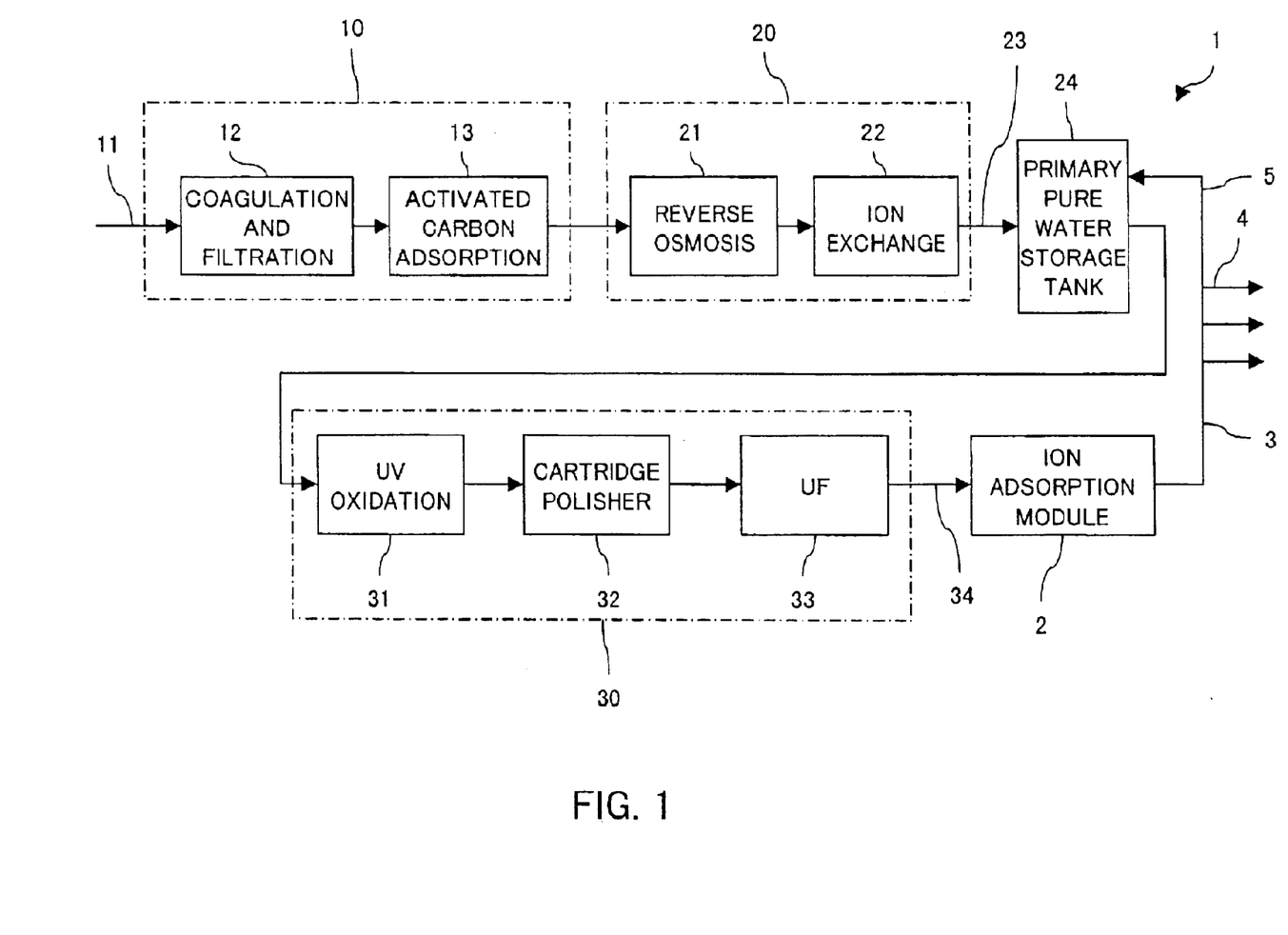
FIG. 1 is a flow diagram showing a high-purity water producing apparatus according to a preferred embodiment of the present invention.

A high-purity water producing apparatus according to a preferred embodiment of the present invention will now be described referring to FIG. 1. As shown in FIG. 1, a high-purity water producing apparatus 1 comprises a pretreatment device 10, a primary pure water producing device 20 and a secondary pure water producing device 30

(subsystem), and an ion adsorption module 2 provided midway on a transporting pipe 3 for high-purity water connecting the secondary pure water producing device 30 and a point-of-use 4. The ion adsorption module 2 is provided for treating high-purity water and stably to remove a very small amount of both particulates and ion compositions contained in the high-purity water for a long period of time.

The pretreatment device 10 comprises, for example, a coagulation and filtration unit 12 and an activated carbon column 13. The primary pure water producing device 20 comprises, for example, a reverse osmosis membrane module 21 charged with a reverse osmosis membrane and an ion exchange unit 22 such as a two-bed three-column water deionization system or a mixed bed water deionization system. The secondary pure water producing device 30 comprises, for example, an ultraviolet oxidation device 31, a non-regenerable cartridge polisher 32 filled with ion exchange resins, and an ultrafiltration membrane device 33. A primary pure water storage tank 24 is provided for storing the primary pure water and a portion of the high-purity water recirculated after another portion of the high-purity water supplied to the point-of-use 4 has been consumed.

In the present embodiment, the high-purity water producing apparatus for producing high-purity water 34 which is to be treated by the ion adsorption module 2 is not limited to the configuration exemplified above, and may be any device which includes at least one deionization process such as an ion exchange unit, a reverse osmosis membrane device, or a distillation device. Therefore, the high-purity water in the present embodiment may be water that is treated by the pretreatment device, primary pure water producing device, and secondary pure water producing device as described above, or water having a resistivity of 10 MΩ-cm or greater. If the purity of the water to be treated is too low, the porous ion exchanger filled in the ion adsorption module 2 becomes saturated in a short period of time, resulting in an increase in the replacement frequency of the ion adsorption module 2, which is not desirable.

The ion adsorption module 2 used in the present embodiment is provided midway on the transporting pipe 3 for high-purity water connecting the secondary pure water producing device 30 and the point-of-use 4. The position for which the ion adsorption module 2 is provided is not limited, but it is desirable that the ion adsorption module 2 be provided in the vicinity of the point-of-use 4. In other words, by providing the ion adsorption module 2 near the point-of-use, the ion adsorption module 2 of the present invention can function as desired even when the transporting pipe 3 for high-purity water is several tens of meters long or longer and impurities are mixed into the high-purity water which is being transported. In addition, depending on the objective of use of water at the point-of-use, it is possible to provide a gas dissolving membrane device upstream of or downstream of the ion adsorption module 2 to dissolve gas such as ozone and hydrogen and/or to provide an ultrafiltration membrane device further in the downstream.

The ion adsorption module 2 comprises a container-shaped support structure having an inlet connected to a flow-in pipe for water to be treated and an outlet connected to a flow-out pipe for treated water and an organic porous ion exchanger which is charged into the support structure. The basic structure of the ion exchanger which fills the ion adsorption module is a continuous bubble structure having mesopores with an average diameter of 1 $\mu$m–1000 $\mu$m, more preferably 10 $\mu$m–100 $\mu$m, within the walls of interconnected macropores, or, alternatively, a continuous bubble structure which may contain discontinuous micropores with an average diameter of 5 nm–800 nm, more preferably 2 nm–500 nm on the inner walls of the bubble structure formed of the macropores and mesopores. More specifically, the continuous bubble structure has overlapping macropores with an average diameter of 2 $\mu$m–5000 $\mu$m and mesopores having the overlapping portion acting as common openings. Most of the continuous bubble structure is an open pore structure. In an open pore structure, when water flows, the section within the bubble structure formed of the macropores and the mesopores forms the flow path. If the average diameter of the mesopores is less than 1 $\mu$m, the pressure loss during water flow becomes large. If, on the other hand, the average diameter of the mesopores is greater than 1000 $\mu$m, flow path of water tends to non-uniformly formed. Therefore, these configurations are not desirable. With the porous ion exchanger having the continuous bubble structure as described above, it is possible to significantly increase the pore capacity and specific surface area. In addition, by introducing the micropores having the specific pore diameter as described above in the inner wall of the bubble structure, the specific surface area can be further increased. The micropores are formed of fine convexes and concaves and the average diameter of the micropores can be determined by the known mercury porosimetry.

The porous ion exchanger is a porous body having a total pore volume of 1 ml/g–50 ml/g. The ion exchanger with a total pore volume of less than 1 ml/g is not desirable because with such a pore volume, the amount of water flow per unit cross sectional area is restricted and a large amount of water flow cannot be achieved. On the other hand, the ion exchanger with a total pore volume exceeding 50 ml/g is not desirable because with such a pore volume, the percentage of the polymer skeleton section is reduced and the strength of the porous body is significantly reduced. As the material of the skeleton section forming the continuous bubble structure, an organic polymer material which has a chemical confinement point such as a crosslinked structure or an organic polymer material having a physical confinement point such as a crystal section is employed. When the polymer material is a polymer having a crosslinked structure, it is desirable that the polymer material contains 5 mol % to 90 mol % of crosslinked structure units with respect to the total structural units forming the polymer material. A polymer with the amount of the crosslinked structure units being less than 5 mol % is not desirable because the mechanical strength is insufficient and a polymer with the amount of the crosslinked structure units exceeding 90 mol % is not desirable because with such a polymer, it is difficult to introduce an ion exchange group, and, consequently, the ion exchange capacity is reduced. The type of the polymer material is not limited and examples of the polymer material include, for example, a styrene-based polymer such as polystyrene, poly($\alpha$-methylstyrene), and polyvinyl benzyl chloride and a bridged structure of the styrene-based polymer; a polyolefin such as polyethylene and polypropylene and a bridged structure of the polyolefin; a poly(halogenated olefin) such as polychlorovinyl and polytetrafluoroethylene and a bridged structure of the poly (halogenated olefin); a nitrile-based polymer such as polyacrylonitrile and a bridged structure of the nitrile-based polymer; a (metha)acryl-based polymer such as methyl polymethacrylate and ethyl polyacrylate and a bridged structure of the (meta)acryl-based polymer; a styrene-divinyl benzene copolymer; and a vinyl benzyl chloride-divinyl benzene copolymer. The polymer as describe above may be a homopolymer obtained by polymerizing a single monomer, a copolymer obtained by polymerizing a plurality of monomers, or a structure in which two or more types of polymers are blended. Among the organic polymer materials, the styrene-divinyl benzene copolymer and the vinyl benzyl chloride-divinyl benzene copolymer are particularly desirable because of the ease of introduction of ion exchange groups into these copolymers and the high mechanical strength of these copolymers. The continuous bubble structure of the porous ion exchanger of the present embodiment can be relatively easily observed using a scanning electron microscope (SEM).

The porous ion exchanger used in the present embodiment is a porous ion exchanger in which an ion exchange group is uniformly distributed and the ion exchange capacity is 0.5 (mg equivalent weight)/(gram of dried porous body) or greater, more preferably, greater than 2.0 (mg equivalent weight)/(g of dried porous body). A porous body with the ion exchange capacity of less than 0.5 (mg equivalent weight/g of dried porous body) is not desirable because with such a porous body, the ion adsorption capability is low and the module replacement frequency becomes high. With a porous body in which an ion exchange group is nonuniformly distributed, the adsorbed ions tend to spread within the module in the direction of flow, causing elongation of the ion exchange band which is a mixture region of an ion adsorbing section and a non-adsorbing section within the module and higher tendency for small amounts of leakage of adsorbed ions. Such a porous body is not desirable as the replacement frequency of the module is further increased. Here, the description, "ion exchange group is uniformly distributed" refers to a structure in which the distribution of the ion exchange group is uniform at least in the order of micrometers ($\mu$m). The distribution of the ion exchange group can be relatively easily checked using an electron probe microanalyzer (EPMA), through secondary ion mass spectroscopy (SIMS), etc.

Examples of the ion exchange group introduced into the porous body include a cation exchange group such as carboxylic acid group, iminodiacetic acid group, sulfonic acid group, phosphoric acid group, aminophosphoric acid group, iminophosphoric acid group, and an aromatic hydroxyl group; an anion exchange group such as quaternary ammonium group, tertiary amino group, secondary amino group, primary amino group, polyethylene imine, tertiary sulfonium group, and phosphonium group; an amphoteric ion exchange group such as betaine and sulfobetaine; a chelate formation group such as iminodiacetic acid group, phosphoric acid group, phosphoric ester group, aminophosphoric acid group, iminophosphoric acid group, an aromatic hydroxyl group, aliphatic polyol, and polyethylene imine. These ion exchange groups may be introduced as a single entity or in a combination depending on the objective of the use, to obtain a porous ion exchanger.

As an example of organic porous bodies having a continuous pore, a porous body having a particle-aggregated structure is disclosed in F. Svec, Science, 273, 205–211 (1996). Japanese Patent Laid-Open Publication Nos. Hei 10-216717, Hei 10-192717, Hei 10-192716, and Hei 8-252579 disclose particle-aggregated porous body structures in which a mixture of a cation exchange resin and an anion exchange resin is bonded using a bonding polymer. These particle-aggregated porous bodies are formed by, for example, bonding, using a bonding polymer, organic particulates or granular ion exchange resins to which an ion exchange group is introduced in advance or by filling a predetermined cast with particulates, thermally fusing, and bonding the particulates. In some cases, an ion exchange group is also introduced to the bonding polymer section. In the particle-aggregated porous bodies described above, however, because the pore capacity is small and large-size mesopores cannot be formed due to the particle-aggregated structure, treatment of large amount of flow at a low pressure is restricted. In addition, in the particle-aggregated porous body, the ion exchange group or the like is not uniformly distributed within the porous body. That is, in these porous body structures, there is no ion exchange group in the bonding polymer section, or, even if there is an ion exchange group in the bonding polymer section, because the structures of the polymer base and ion exchange group are different in the bonding polymer section from those in the ion exchange resin section and because the density of the ion exchange group is lower in the bonding polymer section than in the ion exchange resin section, these porous body structures are not, as a whole, a uniform ion exchanger. Such being the case, the adsorbed ions tend to spread within the module in the direction of flow, causing elongation of an ion exchange band which is a mixture region of the ion adsorbing portion and non-adsorbing portion within the module and greater tendency of small amounts of leakages of adsorbed ions, which lead to a problem in that the frequency of replacement of the module is increased.

The porous ion exchanger used in the present embodiment has a spongy structure having an open cell structure communicating with the outside. The "spongy structure" described herein refers to a bubble-dispersed porous body in which bubbles are dispersed within a solid, as defined in Yasushi Takeuchi, Characteristics and Application Techniques of Porous Bodies, Fujitech Corporation, 2000, p. 2–5. The porous body having a spongy structure completely differs from the particle-aggregated porous bodies disclosed in Japanese Patent Laid-Open Publication Nos. Hei 10-216717, Hei 10-192717, Hei 10-192716, and Hei 8-252579. The use of a porous body having a spongy structure is advantageous because such a structure enables formation of uniform cell structure and significant increase in the total pore volume and the specific surface area compared to the particle-aggregated porous bodies. In addition, because an ion exchange group or the like is uniformly distributed within the porous ion exchanger of the present embodiment as described above, spread of the adsorbed ions within the module in the direction of flow is reduced, the ion exchange band is shortened, and tendency of the small amounts of leakage of adsorbed ions is lower. Because of these features, it is possible to stably use the module for a long period of time.

The method for manufacturing the porous ion exchanger is not limited and examples of the method include a one-step method for converting a composition including an ion exchange group into a porous body and a method for forming a porous body from a composition which does not contain an ion exchange group and then introducing an ion exchange group. An example method for manufacturing a porous ion exchanger will now be described. The porous ion exchanger is manufactured by mixing an oil-soluble monomer which does not contain an ion exchange group, a precipitation agent when necessary, a surfactant, water, and a polymerization initiator when necessary to obtain a water-in-oil type emulsion, polymerizing the emulsion to obtain a porous body, and introducing an ion exchange group. The precipitation agent is a compound which is a poor solvent with respect to the polymer obtained by polymerizing the oil-soluble monomer and which dissolves the oil-soluble monomer. The precipitation agent is used when it is desired to form fine convexes and concaves on the inner wall of a bubble structure formed of macropores and mesopores.

The oil-soluble monomer which does not contain an ion exchange group refers to a lipophilic monomer which does not contain an ion exchange group such as carboxylic acid group and sulfonic acid group and having a low solubility to water. Specific examples of the monomer include styrene, α-methyl styrene, vinyl toluene, vinyl benzyl chloride, divinyl benzene, ethylene, propylene, isobutene, butadiene, isoprene, chloroprene, vinyl chloride, vinyl bromide, vinylidene chloride, tetrafluoroethylene, acrylonitrile, methacrylonitrile, vinyl acetate, methyl acrylate, ethyl acrylate, butyl acrylate, 2-ethyl hexyl acrylate, trimethylol propane triacrylate, butanediol diacrylate, methyl methacrylate, ethyl methacrylate, propyl methacrylate, butyl methacrylate, 2-ethyl hexyl methacrylate, cyclohexyl methacrylate, benzyl methacrylate, glycidyl methacrylate, and ethylene glycol dimethacrylate. These monomers may be used as a single entity or may be used in a mixture of two or more types of monomers. In the present embodiment, it is desirable to select a crosslinked monomer such as divinyl benzene and ethylene glycol dimethacrylate at least as a constituent of the monomer and adjust the content of such monomer to 1 mol %–90 mol %, more preferably, 3 mol % to 80 mol % of the total oil-soluble monomers because such a monomer provides a mechanical strength required for introducing a large amount of ion exchange group in the later processes.

As a precipitation agent which is a poor solvent with respect to a polymer obtained by polymerizing the oil-soluble monomer and which dissolves the oil-soluble monomer, various materials can be selected depending on the type of the oil-soluble monomer. For example, when a mixture of styrene and divinyl benzene is used as the oil-soluble monomer, an aliphatic hydrocarbon such as hexane, heptane, octane, isooctane, and decane; and an alcohol such as 1-butanol, 2-butanol, 2-methyl-2-butanol, and methylisobuthyl carbinol may be used as the precipitation agent. The amount of addition of the precipitation agent varies depending on the amount of divinyl benzene within the oil-soluble monomers, but can be selected within a range of 10% to 70%, more preferably 20% to 60%, of the total amount of the oil-soluble monomers and precipitation agent. With the addition of the precipitation agent as described above, for example, it becomes difficult for an initial polymer of the styrene and divinyl benzene to dissolve into the oil component such as the oil-soluble monomers, resulting in precipitation of the polymer in a form of microparticles which then become a collected body to form fine convexes and concaves on the surface. Here, the diameter of the micropores can be controlled by suitably selecting the amount of the precipitation agent added and by suitably selecting a mixture ratio of the crosslinked monomer and the precipitation agent. In addition to the method for adding a precipitation agent as described above, the micropores may be formed by, for example, a method for adding a linear chain polymer which is a polymer of the oil-soluble monomer, a method for adding, along with the precipitation agent, a swelling agent which is a good solvent with respect to the polymer formed by polymerization of the oil-soluble monomer, and a method for using the linear chain polymer and the swelling agent or the linear chain polymer and the precipitation agent.

The type of surfactant is not limited as long as a water-in-oil type (W/O) emulsion can be formed when the oil-soluble monomer which does not contain an ion exchange group and water are mixed. Examples of such surfactant include non-ionic surfactants such as sorbitan monooleate, sorbitan monolaurate, sorbitan monopalmitate, sorbitan monostearate, sorbitan trioleate, polyoxy ethylene nonylphenyl ether, polyoxy ethylene stearyl ether, and polyoxy ethylene sorbitan monooleate; anion surfactants such as potassium oleate, sodium dodecylbenzenesulfonate, and sodium dioctyl sulfosuccinate; cation surfactants such as distearyl dimethyl ammonium chloride; and amphoteric surfactants such as lauryl dimethyl betaine. These surfactants can be used as a single entity or in a combination of two or more types of surfactants. A water-in-oil type emulsion refers to an emulsion in which the oil phase forms a continuous phase and water is dispersed in the oil. Because the amount of addition of the surfactant greatly varies depending on the type of the oil-soluble monomer and the target size of the emulsion particles (macropores), the amount of addition of the surfactant cannot be generalized, but the amount can be selected, for example, in a range from approximately 2% to 70% with respect to the total amount of the oil-soluble monomer and the surfactant. In addition, although not required, it is also possible to add into the system alcohol such as methanol and stearyl alcohol; a carboxylic acid such as stearic acid; and hydrocarbon such as benzene, toluene, octane, and dodecane in order to control the shape and size of the bubble in the porous ion exchanger.

As the polymerization initiator, a compound in which a radical is generated when heated or irradiated with light is preferably used. The polymerization initiator may be water-soluble or oil-soluble, and examples include azobisisobutyronitrile, azobiscyclohexanenitrile, azobiscyclohexanecarbonitrile, benzoyl peroxide, potassium persulfate, ammonium persulfate, hydrogen peroxide-ferrous chloride, sodium persulfate-sodium bisulfite, and tetramethylthiuram disulfide. In some cases, there may be a system wherein polymerization occurs by heating or irradiation of light alone without addition of the polymerization initiator. In such a system, the polymerization initiator is not required.

The order of mixing of the oil-soluble monomer which does not contain an ion exchange group, the surfactant, water, and the polymerization initiator to form the water-in-oil type emulsion is not limited, and various methods can be employed such as, for example, a method for mixing all compositions at once; and a method for separately and uniformly dissolving the oil-soluble compositions and water-soluble compositions, the oil-soluble compositions being the oil-soluble monomer, surfactant, and oil-soluble polymerization initiator and the water-soluble compositions being the water and water-soluble polymerization initiator, and mixing the respective compositions. There is no limitation on the mixing device for forming the emulsion, and typical devices such as a mixer, a homogenizer, a high-pressure homogenizer, and a planet mixer can be used with the emulsification conditions suitably set to achieve a target emulsion particle diameter. When a precipitation agent is used and the oil-soluble compositions and the water-soluble compositions are separately prepared, the precipitation agent is mixed into the oil-soluble compositions.

As the polymerization conditions for polymerizing the water-in-oil type emulsion thus obtained, various conditions can be selected depending on the type of the monomer and the system of the polymerization initiator. For example, when azobisisobutyronitrile, benzoyl peroxide, potassium persulfate, or the like is used as the polymerization initiator, polymerization may be performed by heating in a sealed container under an inert atmosphere for 1 hour to 48 hours at 30° C. to 100° C. When, on the other hand, hydrogen peroxide-ferrous chloride, sodium persulfate-sodium bisulfite, or the like is used as the polymerization initiator, polymerization may be performed in a sealed container under an inert atmosphere for 1 hour to 48 hours at 0° C. to 30° C. After polymerization is completed, the content is taken out, and, when necessary, a solvent extraction process is performed using a solvent such as isopropanol in order to remove unreacted monomers and surfactant, to obtain a porous body.

The method for introducing an ion exchange group to the porous body is not limited, but a method for introducing through polymer reaction is preferably used because such a method allows highly dense and uniform introduction of anion exchange group. For example, as a method for introducing sulfonic acid group, when the organic porous body is a styrene-divinyl benzene copolymer or the like, a method for sulfonating using chlorosulfuric acid, concentrated sulfuric acid, or fuming sulfuric acid may be employed. As a method for introducing quaternary ammonium group, when the organic porous body is a styrene-divinyl benzene copolymer or the like, a method for introducing a chloromethyl group using chloromethylmethyl ether or the like and then reacting with a tertiary amine or a method for producing an organic porous body by copolymerization of chloromethyl styrene and divinyl benzene and reacting the organic porous body with a tertiary amine may be employed. As a method for introducing betaine, a method for introducing a tertiary amine into an organic porous body through a process described above and then reacting and introducing monoiodoacetic acid may be employed. As a method for introducing an aliphatic polyol which is a chelate formation group, a method for reacting N-methylglucamine or the like with an organic porous body having a chloromethyl group may be employed. Examples of the ion exchange group to be introduced include a cation exchange group such as carboxylic acid group, iminodiacetic acid group, sulfonic acid group, phosphoric acid group, aminophosphoric acid group, iminophosphoric acid group, and an aromatic hydroxyl group; an an ion exchange group such as quaternary ammonium group, tertiary amino group, secondary amino group, primary amino group, polyethylene imine, tertiary sulfonium group, and phosphonium group; an amphoteric ion exchange group such as betaine and sulfobetaine; a chelate formation group such as iminodiacetic acid group, phosphoric acid group, phosphoric ester group, aminophosphoric acid group, iminophosphoric acid group, an aromatic hydroxyl group, aliphatic polyol, and polyethylene imine. These ion exchange groups may be introduced as a single entity or in a combination to obtain a porous ion exchanger.

The module form of the ion adsorption module is not limited. For example, a system wherein water is passed through ascending flow or descending flow in a filled layer of a simple cylindrical shape, an external pressure system wherein water is passed from outside in the radial direction to an inner tube of a filled layer of a tubular shape, an internal pressure system wherein water is passed in the reverse direction, a tubular system wherein a plurality of elongated tubular porous ion exchangers are tied and filled and water is passed using the inner pressure system or external pressure system, a planar membrane system wherein a filled layer of a sheet shape is used, and a pleat system wherein a planar membrane is processed into a folded shape may be employed. The shape of the porous ion exchanger to be filled may be suitably selected depending on the module system. Example shapes include a block shape, a sheet shape, a cylindrical shape, and a tubular shape. Example methods of molding these shapes include a molding method for cutting a block-shaped porous ion exchanger and a method for filling a mold frame of a target shape with emulsion during the manufacturing steps and allowing polymerization to occur in the mold frame.

The type and the form of filling of the porous ion exchanger filled into the ion adsorption module can be suitable determined based on the objective of the use, that is, the types of the impurities to be adsorbed. In other words, it is possible to fill the module with a porous anion exchanger, a porous cation exchanger, and/or a porous chelate adsorption body as a single entity or in a mixed combination. As a method for mixing, it is possible to employ, for example, layering in the direction of the flow and mixing and filling of small blocks of ion exchangers. In addition, it is also possible to combine in a suitable order modules filled respectively with a porous anion exchanger, a porous cation exchanger, and a porous chelate adsorption body as a single entity. Among these methods, a method for singly fill the module with the porous ion exchanger is desirable as this method enables effective removal of metals which particularly influences semiconductor devices.

Next, a method for producing high-purity water using a high-purity water producing apparatus 1 shown in FIG. 1 will be described. First, raw water 11 such as industrial water, city water, well water, and river water is treated by a pretreatment device 10 comprising a coagulation and filtration unit 12 and an active carbon column 13 so that most of suspended and organic substances in the raw water is removed. Then, the pretreated water is treated by a reverse osmosis membrane module 21 charged with a reverse osmosis membrane so that ions and TOC are removed. A treatment by the ion exchange device 22 is then applied and primary pure water 23 is obtained. The primary pure water 23 is temporarily stored in the primary pure water storage tank 24, and is later treated by the secondary pure water producing device 30 which comprises the ultraviolet oxidation device 31, the non-regenerable cartridge polisher 32 filled with ion exchange resins, and the ultrafiltration membrane device 33 so that high-purity water 34 is obtained in which impurities such as the particulates, colloidal materials, organic substances, metals, and ions remaining in small amounts in the primary pure water are removed as much as possible. When the high-purity water 34 is supplied to the ion adsorption module, the high-purity water flows though the continuous bubble structure of the organic porous ion exchanger and both particulates and ionic impurities are removed. When an organic porous ion exchanger is used in which discontinuous micropores are present on the inner wall of the bubble structure, particulates are captured in the micropores and the removal efficiency can be further improved. The treated water from which impurities are removed by the ion adsorption module is used for washing semiconductor devices in each point-of-use 4 and the remaining high-purity water is circulated to the primary pure water storage tank 24. In this manner, because the ion adsorption module 2 is filled with the porous ion exchanger having a specific structure, both particulates and ionic compositions present in a minute amount in the high-purity water can be removed, allowing for stable maintenance, for a long period of time, of the high purity suitable for manufacture of highly integrated devices or the like and for significant reduction in the frequency of replacement of the module.

Figure 2:
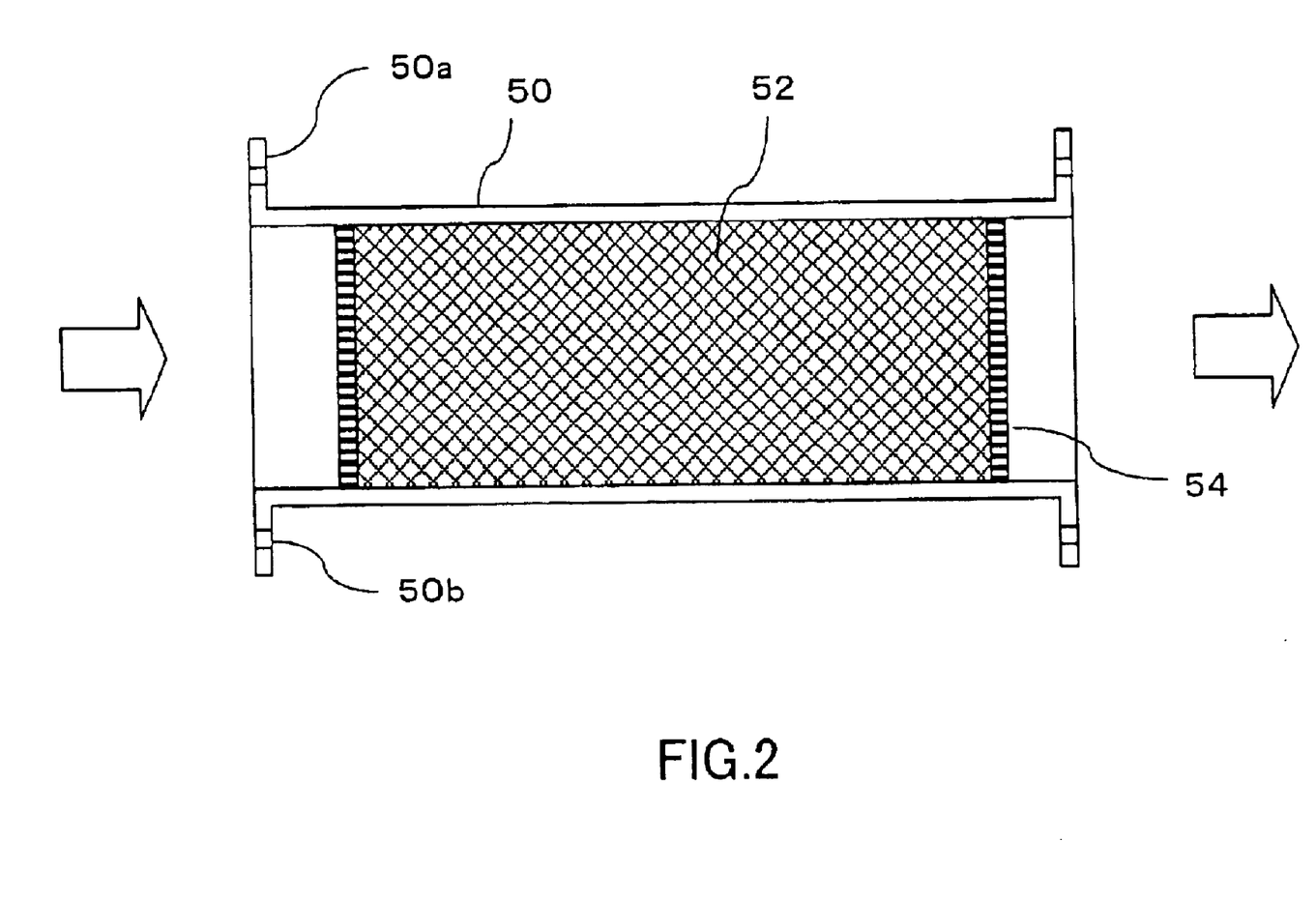
FIG. 2 is a diagram showing a structure of a module in the preferred embodiment of the present invention.

FIG. 2 is a diagram schematically showing a structure of the ion adsorption module. As shown in FIG. 2, the module comprises an organic porous ion exchanger 52 provided inside a pipe-shaped member 50 forming a portion of the transporting pipe for high-purity water. A flange section 50a which extends outward is formed on each end of the pipe member 50 and a bolt hole 50b is formed in the flange section 50a. It is possible to easily mount the module midway on the pipe using the flange section 50a. In addition, a porous support member 54 is placed on each end of the organic porous ion exchanger 52, for fixing the organic porous ion exchanger 52 to the pipe member 50.

EXAMPLES

The present embodiment will now be more specifically described using examples. These examples are, however, for exemplifying purpose only and should not be interpreted as limiting the present embodiment in any way.

Example 1
(Manufacture of Organic Porous Body)

27.7 g of styrene, 6.9 g of divinyl benzene, 0.14 g of azobisisobutyronitrile (ABIBN), and 3.8 g of sorbitan monooleate were mixed and uniformly dissolved. Then, the mixture of styrene/divinyl benzene/azobisisobutyronitrile/sorbitan monooleate was added to 450 ml of deionized water and the water mixture was stirred for 2 minutes using a homogenizer at a rate of 20,000 revolutions/minute to obtain a water-in-oil type emulsion. After emulsification was completed, the water-in-oil type emulsion was transferred to an autoclave made of stainless steel, the atmosphere was sufficiently replaced by nitrogen, the autoclave was sealed, and polymerization was allowed to occur for 24 hours under 60° C. in rest condition. After polymerization was completed, the contents of the autoclave were taken out, a Soxhlet extraction was performed for 18 hours using isopropanol, unreacted monomer and sorbitan monooleate were removed, and drying under reduced pressure was applied at 40° C. overnight. 11.5 g of the organic porous body obtained in this manner having a crosslinked composition made of a styrene/divinyl benzene copolymer in an amount of 14 mol % was separated as an aliquot, 800 ml of dichloroethane was added, and the mixture was heated at 60° C. for 30 minutes and then cooled to the room temperature. 59.1 g of chlorosulfuric acid was gradually added and a reaction was allowed to occur for 24 hours at the room temperature. Then, acetic acid was added, the reactants were added to a large amount of water, washed by water, and dried, and a porous cation exchanger was obtained. The ion exchange capacity of the porous body was 4.4 mg equivalent weight/g when scaled in terms of dried porous body and 0.32 mg equivalent weight/ml when scaled in terms of volume of wet body. It was confirmed through mapping of sulfur atoms using EPMA that the sulfonic acid group was uniformly introduced to the porous body. Results of SEM observation indicated that the inner structure of the organic porous material had a continuous bubble structure wherein most of macropores having an average diameter of 30 $\mu$m overlapped, the diameter of mesopores formed by the overlap of macropores was 5 $\mu$m, the total pore volume was 10.1 ml/g, and the BET specific surface area was 10 m$^2$/g.

(Manufacturing Example 1 of Ion Adsorption Module)

The porous ion exchanger thus obtained was cut in a wet condition to obtain a cylindrical porous ion exchanger having a diameter of 5 cm and a height of 5 cm. The cylindrical porous ion exchanger was filled into a high-density polyethylene column having an inner diameter of 5 cm, was regenerated using nitric acid having a concentration of 1 mol/L, and sufficiently washed by high-purity water to form a regenerated form, and an ion adsorption module was obtained.

(Water Passing Experiment 1)

Figure 3:
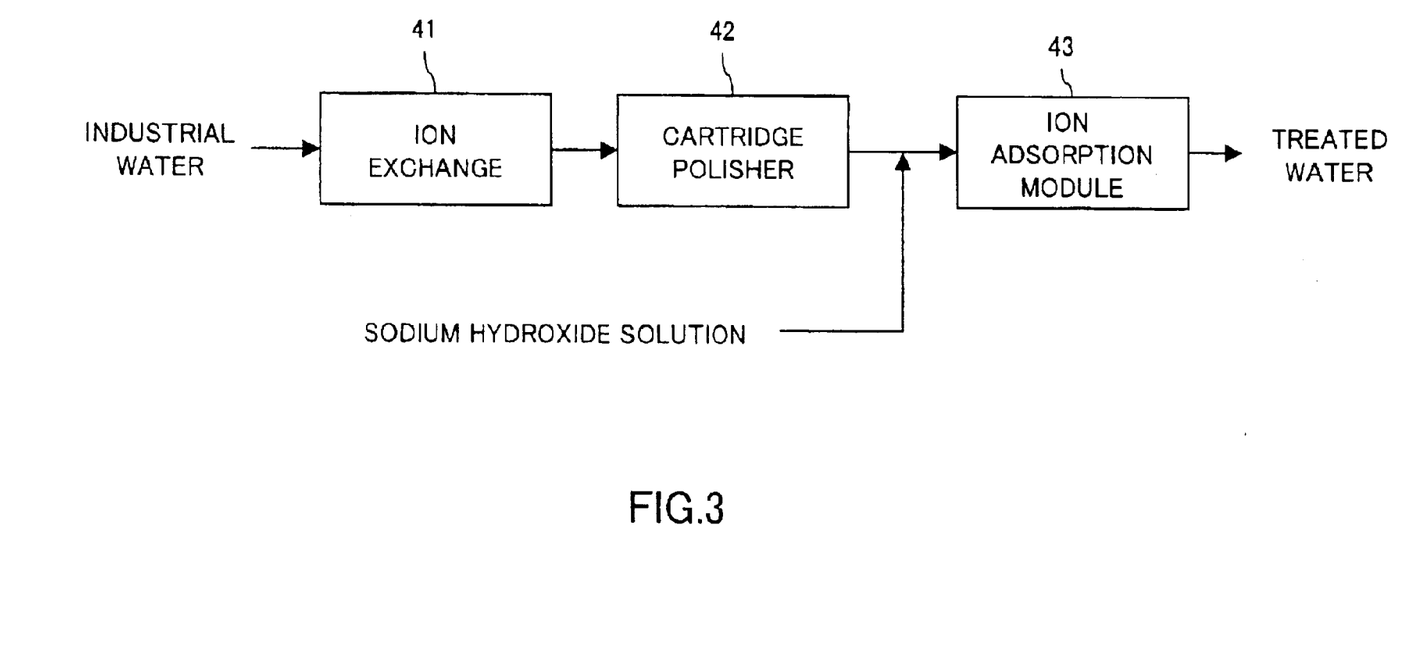
FIG. 3 is a flow diagram showing an apparatus for water passing experiment used in examples and comparative examples.

Using an apparatus shown in FIG. 3 and feeding therethrough simulated polluted pure water obtained by adding sodium hydroxide to pure water, it was confirmed that water with superior quality can be obtained at the exit when the polluted pure water was passed through the ion adsorption module.

More specifically, using industrial water as feed water, the feed water was introduced first into an ion exchange device 41 for ion exchange treatment. Then, the treated water of the ion exchange device 41 was introduced to a cartridge polisher for a further ion exchange treatment and pure water was obtained. The specific resistance of the obtained pure water was approximately 18.2 M$\Omega$-cm. Then, a sodium hydroxide solution was injected to the pure water to obtain simulated polluted pure water with a sodium concentration of 1.0 $\mu$g/L. The number of particulates (0.2 $\mu$m or greater) at the exit of the cartridge polisher was 84/ ml.

The simulated polluted pure water was passed through an ion adsorption module 43 as described above at a flow rate of 1 L/min and the sodium concentration and the number of particulates in the treated water were measured.

The sodium concentration was measured by applying an inductively coupled plasma-mass spectroscopy (ICP-MS) to sample water and the number of particulates was measured by laser light scattering method. The results indicated that the sodium concentration of the treated water was 10 ng/L or less and the number of particulates (0.2 $\mu$m or greater) was 1/ ml or less.

Example 2
(Manufacture of Organic Porous Body)

Figure 4:
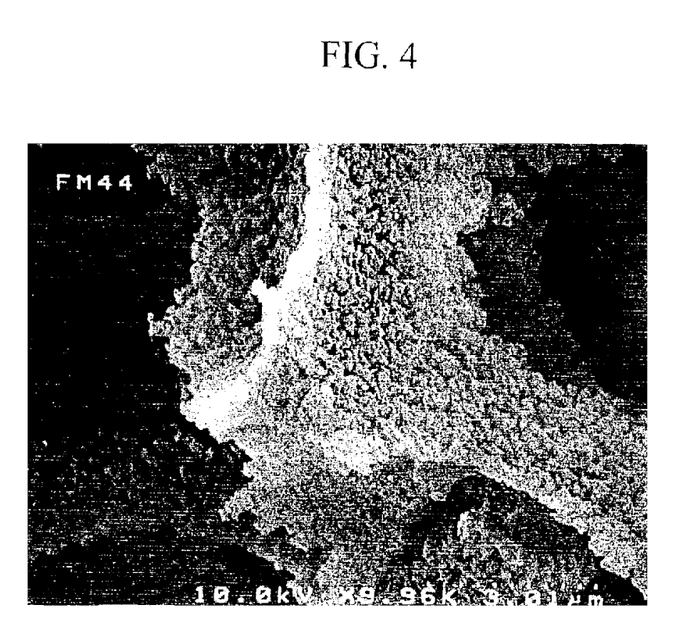
FIG. 4 is a photograph by a scanning electron microscope showing fine structure of an organic porous body according to the preferred embodiment of the present invention.

32.91 g of styrene, 17.72 g of divinyl benzene, 21.70 g of n-heptane, 8.04 g of sorbitan monooleate, and 0.29 g of azobisisobutyronitrile (ABIBN) were mixed and uniformly dissolved. The mixture of styrene/divinyl benzene/n-heptane/sorbitan monooleate/azobisisobutyronitrile was added to 450 ml of deionized water and the solution was stirred using a homogenizer for 2 minutes at a rate of 20,000 revolutions/minute, to obtain a water-in-oil type emulsion. After emulsification was completed, the water-in-oil type emulsion was transferred to an autoclave, the atmosphere was sufficiently replaced by nitrogen, the autoclave was sealed, and polymerization was allowed to occur for 24 hours at 60° C. under a rest condition. After the polymerization was completed, the contents in the autoclave were taken out, a Soxhlet extraction process was applied for 18 hours using isopropanol, and unreacted monomer, n-heptane, water, and sorbitan monooleate were removed. Drying treatment under a reduced pressure was applied at 85° C. for overnight. FIG. 4 shows a result of observation by SEM of the internal structure of an organic porous body obtained in this manner and containing a crosslinked composition of styrene/divinyl benzene copolymer in an amount of 26 mol %. In FIG. 4, the "L" shaped section in the center is the inner wall of the bubble shape of the skeleton structure and the dark portions at the top right side and left side are mesopores. On the deeper side of the mesopore, an inner wall of the bubble structure of the skeleton structure can be seen. As shown, the organic porous body has a continuous bubble structure wherein most of macropores having an average diameter of 20 $\mu$m are overlapped, the diameter of the mesopore formed by the overlap of the macropores is in a range of 0.8 $\mu$m–20.1 $\mu$m with an average diameter of 4.3 $\mu$m, and fine convexes and concaves shape can be observed (these convexes and concaves on the surface of the skeleton structure in FIG. 4) on the inner wall of the bubble structure formed by the macropores and the mesopores. It was observed that the fine convexes and concaves on the inner wall surface of the bubble structure were discontinuous micropores having diameters determined by mercury porosimetry within a range of 6 nm to 600 nm and an average diameter of 240 nm. The total pore volume was 5.0 ml/g and the BET specific surface area was 64 m$^2$/g.

(Manufacture of Organic Porous Ion Exchanger)

The obtained organic porous body was cut so that 11.5 g of the organic porous body was separated as an aliquot. 800 ml of dichloroethane was added to the aliquot and the aliquot was heated at 60° C. for 30 minutes and then cooled to the room temperature. 59.1 g of chlorosulfuric acid was gradually added and reaction was allowed to occur for 12 hours at the room temperature. Then, acetic acid was added and the reactants were introduced into a large amount of water, washed by water, and dried, and a porous cation exchanger was obtained. The ion exchange capacity of the porous body was 4.4 mg equivalent weight/g in terms of dried porous body and 0.32 mg equivalent weight/ml in terms of volume of wet body. It was confirmed by mapping of sulfur atoms using EPMA that the sulfonic acid group was uniformly introduced to the porous body.

(Manufacture Example 2 of Ion Adsorption Module)

The obtained porous ion exchanger was cut in a wet condition to obtain a cylindrical porous ion exchanger with a diameter of 5 cm and a height of 5 cm. The cylindrical porous ion exchanger was filled into a high-density polyethylene column having an inner diameter of 5 cm, regenerated using nitric acid having a concentration of 1 mol/L, and sufficiently washed using deionized water to form a regenerated form, and an ion adsorption module was obtained.

(Water Passing Experiment 2)

A water passing experiment was performed under conditions similar to the above water passing experiment 1 except that an ion adsorption module obtained through the process of the manufacture example 2 was used. The results indicated that the sodium concentration of the treated water was 10 ng/L or less and the number of particulates (0.2 $\mu$m or greater) was 1/ml or less.

Comparative Example 1

An experiment similar to the above-described water passing experiment 1 was performed except that, as an ion adsorption module, a membrane module wherein a strong acidic cation exchange group was chemically introduced on a membrane of high-density polyethylene ("Ion Clean AQ" by Nihon Pall Ltd., model number: DFA1UPWSW44, filtration area: 0.16 m$^2$, ion exchange capacity: 8.3 mg equivalent weight/module, size: $\phi$ 72 mm×H 114.5 mm) was used. The results indicated that the sodium concentration of the treated water was 10 ng/L and the number of particulates (0.2 $\mu$m or greater) was 1/ ml or less.

From the results of the examples 1 and 2 and the comparative example 1, it can be seen that, by using the ion adsorption module of the present embodiment, it is possible to obtain treated water having a quality equivalent to or better than when a conventional ion adsorption module is used.

Example 3

An experiment for checking the lifetime of the module was performed using the ion adsorption module of the example 1. A water passing experiment was performed under similar conditions as the water passing experiment 1 except that the sodium concentration of the simulated polluted pure water to be passed through the ion adsorption module was set to 50 mg/L and the flow rate to the ion adsorption module was set to 0.2 L/min. The treated water was periodically sampled and the sodium concentration of the treated water was measured. The results indicated that the sodium concentration of the treated water started to exceed 1 mg/L after 57 minutes has elapsed from the start of passing of the simulated polluted pure water.

Comparative Example 2

A lifetime experiment of a module was performed similar to the example 3 except that an ion adsorption module of the first comparative example was used. The results indicated that the sodium concentration of the treated water started to exceed 1 mg/L after 11 minutes has elapsed from the start of passing of the simulated polluted pure water.

From the example 3 and the comparative example 2, it can be seen that, by using the ion adsorption module of the present embodiment, even when pure water is polluted for some reason, it is possible to maintain superior water quality at the exit for a long period of time and to significantly reduce the replacement frequency of the ion adsorption module. In addition, calculation of the flow-in ion load with respect to the total exchange capacity within the module at the treated water sodium concentration of 1 mg/L yields 79% in the example and 58% in the comparative example, and therefore, the utilization percentage of the ion exchange group is significantly higher in the ion adsorption module according to the present embodiment. Moreover, it has been found that, in addition to the larger exchange capacity per unit volume, the higher utilization percentage makes it possible to achieve a significantly longer lifetime.

As described, according to the present embodiment, because an ion adsorption module filled with an organic porous ion exchanger having a specific structure is provided midway on the transporting pipe for high-purity water connected to a point-of-use, even when a minute amount of micro-impurities such as particulates (particles) and ionic compositions are mixed into the high-purity water which is being transported, it is possible to remove both the particulates and ionic compositions and to stably obtain pure water of high purity suitable for manufacture of highly integrated devices or the like. In addition, the frequency of replacement of the module can be significantly reduced.

What is claimed is:

1. A high-purity water producing apparatus comprising:

a pipe for transporting high-purity water to a point-of use; and a module provided on the pipe and filled with an organic porous ion exchanger having a continuous bubble structure with mesopores, having an average diameter of 1 $\mu$m to 1000 $\mu$m, within a wall between interconnected macropores and in which a total pore capacity is 1 ml/g to 50 ml/g, an ion exchange group is uniformly distributed, and the ion exchange capacity is 0.5 mg equivalent weight/gram of dried porous body or greater, wherein the high purity water is further treated by the module.

2. A high-purity water producing apparatus according to claim 1, wherein discontinuous micropores having an average diameter of 5 nm to 800 nm are formed on an inner wall of a bubble structure formed of the macropores and the mesopore.

3. A high-purity water producing apparatus according to claim 1, wherein the high-purity water supplied to the module is obtained by applying an ion exchange treatment to raw water.

4. A high-purity water producing apparatus according to claim 1, wherein the high-purity water supplied to the module is obtained by treating raw water by a primary pure water producing device which includes an ion exchange process and a secondary pure water producing device which includes a non-regenerable cartridge polisher filled with an ion exchanger.

5. A high-purity water producing apparatus according to claim 4, wherein the secondary pure water producing device comprises a ultraviolet oxidation device, a ultrafiltration device, and a non-regenerable cartridge polisher filled with an ion exchanger.

6. A high-purity water producing apparatus according to claim 1, wherein the organic porous ion exchanger is an organic porous cation exchanger.

7. A high-purity water treating module comprising:
a hollow pipe member; and
an organic porous ion exchanger provided inside the pipe member, having a continuous bubble structure with mesopores, having an average diameter of 1 $\mu$m to 1000 $\mu$m, in a wall between interconnected macropores and in which a total pore capacity is 1 ml/g to 50 ml/g, an ion exchanger group is uniformly distributed, and an ion exchange capacity is 0.5 equivalent weight/gram of dried porous body or greater, wherein the high-purity water treating module is provided midway on the pipe in which high-purity water flows and purifies the high-purity water flowing through the pipe.

8. A high-purity water treating module according to claim 7, further comprising a flange provided on each end of the pipe member.

* * * * *